(12) United States Patent
Wang et al.

(10) Patent No.: US 11,977,185 B1
(45) Date of Patent: May 7, 2024

(54) VARIABLE ANGLE POLYGON FOR USE WITH A LiDAR SYSTEM

(71) Applicant: INNOVUSION IRELAND LIMITED, Los Altos, CA (US)

(72) Inventors: Haosen Wang, Sunnyvale, CA (US); Yimin Li, Cupertino, CA (US)

(73) Assignee: Seyond, Inc., Sunnyvale, CA (US)

( * ) Notice: Subject to any disclaimer, the term of this patent is extended or adjusted under 35 U.S.C. 154(b) by 778 days.

(21) Appl. No.: 16/837,429

(22) Filed: Apr. 1, 2020

Related U.S. Application Data

(60) Provisional application No. 62/829,441, filed on Apr. 4, 2019.

(51) Int. Cl.

| | |
|---|---|
| *G01S 7/481* | (2006.01) |
| *G01S 7/483* | (2006.01) |
| *G01S 7/484* | (2006.01) |
| *G01S 7/486* | (2020.01) |
| *G01S 17/88* | (2006.01) |
| *G01S 17/89* | (2020.01) |
| *G02B 5/09* | (2006.01) |

(52) U.S. Cl.
CPC .......... *G01S 7/4815* (2013.01); *G01S 7/4811* (2013.01); *G01S 7/4817* (2013.01); *G01S 7/483* (2013.01); *G01S 7/484* (2013.01); *G01S 7/486* (2013.01); *G01S 17/88* (2013.01); *G01S 17/89* (2013.01); *G02B 5/09* (2013.01)

(58) Field of Classification Search
CPC .... G01S 7/4811; G01S 7/4815; G01S 7/4817; G01S 7/483; G01S 7/484; G01S 7/486; G01S 17/04; G01S 17/06; G01S 17/08; G01S 17/10; G01S 17/88; G01S 17/89; G01S 17/93; G02B 5/09
See application file for complete search history.

(56) References Cited

U.S. PATENT DOCUMENTS

| | | | |
|---|---|---|---|
| 3,897,150 A | | 7/1975 | Bridges et al. |
| 4,043,632 A | * | 8/1977 | Jeffery ............... G06K 7/10871 |
| | | | 359/217.1 |
| 4,205,100 A | * | 5/1980 | Fisli .......................... G02B 5/09 |
| | | | 359/884 |
| 4,412,720 A | | 11/1983 | Costa |
| 4,464,048 A | | 8/1984 | Farlow |

(Continued)

FOREIGN PATENT DOCUMENTS

| | | |
|---|---|---|
| CN | 204758260 U | 11/2015 |
| CN | 204885804 U | 12/2015 |

(Continued)

OTHER PUBLICATIONS

Chen, X, et al. (Feb. 2010). "Polarization Coupling of Light and Optoelectronics Devices Based on Periodically Poled Lithium Niobate," Shanghai Jiao Tong University, China, Frontiers in Guided Wave Optics and Optoelectronics, 24 pages.

(Continued)

*Primary Examiner* — Yuqing Xiao
*Assistant Examiner* — Benjamin Richard Hebert
(74) *Attorney, Agent, or Firm* — MASCHOFF BRENNAN; Elaine K. Lee; Liang Huang

(57) ABSTRACT

Embodiments discussed herein refer to variable geometry multi-faceted polygon for use with a LiDAR system and methods for the use thereof.

15 Claims, 8 Drawing Sheets

(56) References Cited

U.S. PATENT DOCUMENTS

| | | | |
|---|---|---|---|
| 4,967,076 A * | 10/1990 | Schuhmacher | G06K 7/10693 |
| | | | 250/236 |
| 5,006,721 A | 4/1991 | Cameron et al. | |
| 5,157,451 A | 10/1992 | Taboada | |
| 5,303,084 A | 4/1994 | Pflibsen et al. | |
| 5,319,434 A | 6/1994 | Croteau et al. | |
| 5,369,661 A | 11/1994 | Yamaguchi et al. | |
| 5,442,358 A | 8/1995 | Keeler et al. | |
| 5,546,188 A | 8/1996 | Wangler et al. | |
| 5,579,153 A | 11/1996 | Laming et al. | |
| 5,657,077 A | 8/1997 | Deangelis et al. | |
| 5,687,017 A * | 11/1997 | Katoh | G02B 5/09 |
| | | | 359/850 |
| 5,793,491 A | 8/1998 | Wangler et al. | |
| 5,838,239 A | 11/1998 | Stern et al. | |
| 5,864,391 A * | 1/1999 | Hosokawa | G01S 17/04 |
| | | | 356/5.01 |
| 5,926,259 A | 7/1999 | Bamberger et al. | |
| 5,936,756 A | 8/1999 | Nakajima | |
| 6,163,378 A | 12/2000 | Khoury | |
| 6,317,202 B1 | 11/2001 | Hosokawa et al. | |
| 6,594,000 B2 | 7/2003 | Green et al. | |
| 6,650,404 B1 | 11/2003 | Crawford | |
| 6,788,445 B2 | 9/2004 | Goldberg et al. | |
| 6,788,861 B1 | 9/2004 | Utsui et al. | |
| 6,950,733 B2 | 9/2005 | Stopczynski | |
| 7,128,267 B2 | 10/2006 | Reichenbach et al. | |
| 7,202,941 B2 | 4/2007 | Munro | |
| 7,345,271 B2 | 3/2008 | Boehlau et al. | |
| 7,382,442 B2 | 6/2008 | Adachi et al. | |
| 7,440,084 B2 | 10/2008 | Kane | |
| 7,440,175 B2 | 10/2008 | Di et al. | |
| 7,489,865 B2 | 2/2009 | Varshineya et al. | |
| 7,576,837 B2 | 8/2009 | Liu et al. | |
| 7,830,527 B2 | 11/2010 | Chen et al. | |
| 7,835,068 B1 | 11/2010 | Brooks et al. | |
| 7,847,235 B2 | 12/2010 | Krupkin et al. | |
| 7,869,112 B2 | 1/2011 | Borchers et al. | |
| 7,880,865 B2 | 2/2011 | Tanaka et al. | |
| 7,936,448 B2 | 5/2011 | Albuquerque et al. | |
| 7,969,558 B2 | 6/2011 | Hall | |
| 7,982,861 B2 | 7/2011 | Abshire et al. | |
| 8,072,582 B2 | 12/2011 | Meneely | |
| 8,471,895 B2 | 6/2013 | Banks | |
| 8,736,818 B2 | 5/2014 | Weimer et al. | |
| 8,749,764 B2 | 6/2014 | Hsu | |
| 8,812,149 B2 | 8/2014 | Doak | |
| 8,994,928 B2 | 3/2015 | Shiraishi | |
| 9,048,616 B1 | 6/2015 | Robinson | |
| 9,065,243 B2 | 6/2015 | Asobe et al. | |
| 9,086,273 B1 | 7/2015 | Gruver et al. | |
| 9,194,701 B2 | 11/2015 | Bosch | |
| 9,255,790 B2 | 2/2016 | Zhu | |
| 9,300,321 B2 | 3/2016 | Zalik et al. | |
| 9,304,316 B2 | 4/2016 | Weiss et al. | |
| 9,316,724 B2 | 4/2016 | Gehring et al. | |
| 9,354,485 B2 | 5/2016 | Fermann et al. | |
| 9,510,505 B2 | 12/2016 | Halloran et al. | |
| 9,575,184 B2 | 2/2017 | Gilliland et al. | |
| 9,605,998 B2 | 3/2017 | Nozawa | |
| 9,621,876 B2 | 4/2017 | Federspiel | |
| 9,638,799 B2 | 5/2017 | Goodwin et al. | |
| 9,696,426 B2 | 7/2017 | Zuk | |
| 9,702,966 B2 | 7/2017 | Batcheller et al. | |
| 9,804,264 B2 | 10/2017 | Villeneuve et al. | |
| 9,810,786 B1 | 11/2017 | Welford et al. | |
| 9,812,838 B2 | 11/2017 | Villeneuve et al. | |
| 9,823,353 B2 | 11/2017 | Eichenholz et al. | |
| 9,857,468 B1 | 1/2018 | Eichenholz et al. | |
| 9,869,754 B1 | 1/2018 | Campbell et al. | |
| 9,880,263 B2 | 1/2018 | Droz et al. | |
| 9,880,278 B2 | 1/2018 | Uffelen et al. | |
| 9,885,778 B2 | 2/2018 | Dussan | |
| 9,897,689 B2 | 2/2018 | Dussan | |
| 9,915,726 B2 | 3/2018 | Bailey et al. | |
| 9,927,915 B2 | 3/2018 | Frame et al. | |
| 9,958,545 B2 | 5/2018 | Eichenholz et al. | |
| 10,007,001 B1 | 6/2018 | LaChapelle et al. | |
| 10,012,732 B2 | 7/2018 | Eichenholz et al. | |
| 10,031,214 B2 | 7/2018 | Rosenzweig et al. | |
| 10,042,159 B2 | 8/2018 | Dussan et al. | |
| 10,061,019 B1 | 8/2018 | Campbell et al. | |
| 10,073,166 B2 | 9/2018 | Dussan | |
| 10,078,132 B2 | 9/2018 | Ishikawa et al. | |
| 10,078,133 B2 | 9/2018 | Dussan | |
| 10,094,925 B1 | 10/2018 | LaChapelle | |
| 10,157,630 B2 | 12/2018 | Vaughn et al. | |
| 10,191,155 B2 | 1/2019 | Curatu | |
| 10,215,847 B2 | 2/2019 | Scheim et al. | |
| 10,267,898 B2 | 4/2019 | Campbell et al. | |
| 10,295,656 B1 | 5/2019 | Li et al. | |
| 10,310,058 B1 | 6/2019 | Campbell et al. | |
| 10,324,170 B1 | 6/2019 | Enberg, Jr. et al. | |
| 10,324,185 B2 | 6/2019 | McWhirter et al. | |
| 10,393,877 B2 | 8/2019 | Hall et al. | |
| 10,422,863 B2 | 9/2019 | Choi et al. | |
| 10,429,495 B1 | 10/2019 | Wang et al. | |
| 10,444,356 B2 | 10/2019 | Wu et al. | |
| 10,451,716 B2 | 10/2019 | Hughes et al. | |
| 10,466,342 B1 | 11/2019 | Zhu et al. | |
| 10,502,831 B2 | 12/2019 | Eichenholz | |
| 10,509,112 B1 | 12/2019 | Pan | |
| 10,520,602 B2 | 12/2019 | Villeneuve et al. | |
| 10,557,923 B2 | 2/2020 | Watnik et al. | |
| 10,571,567 B2 | 2/2020 | Campbell et al. | |
| 10,578,720 B2 | 3/2020 | Hughes et al. | |
| 10,591,600 B2 | 3/2020 | Villeneuve et al. | |
| 10,627,491 B2 | 4/2020 | Hall et al. | |
| 10,641,872 B2 | 5/2020 | Dussan et al. | |
| 10,663,564 B2 | 5/2020 | LaChapelle | |
| 10,663,585 B2 | 5/2020 | McWhirter | |
| 10,663,596 B2 | 5/2020 | Dussan et al. | |
| 10,684,360 B2 | 6/2020 | Campbell | |
| 10,782,392 B2 | 9/2020 | Ishikawa et al. | |
| 10,908,262 B2 | 2/2021 | Dussan | |
| 10,908,265 B2 | 2/2021 | Dussan | |
| 10,908,268 B2 | 2/2021 | Zhou et al. | |
| 10,969,475 B2 | 4/2021 | Li et al. | |
| 10,983,218 B2 | 4/2021 | Hall et al. | |
| 11,002,835 B2 | 5/2021 | Pan et al. | |
| 11,009,605 B2 | 5/2021 | Li et al. | |
| 11,194,048 B1 | 12/2021 | Burbank et al. | |
| 2002/0136251 A1 | 9/2002 | Green et al. | |
| 2004/0135992 A1 | 7/2004 | Munro | |
| 2005/0033497 A1 | 2/2005 | Stopczynski | |
| 2005/0190424 A1 | 9/2005 | Reichenbach et al. | |
| 2005/0195383 A1 | 9/2005 | Breed et al. | |
| 2005/0219506 A1 * | 10/2005 | Okuda | G01S 17/931 |
| | | | 356/28 |
| 2006/0071846 A1 | 4/2006 | Yanagisawa et al. | |
| 2006/0132752 A1 | 6/2006 | Kane | |
| 2007/0091948 A1 | 4/2007 | Di et al. | |
| 2007/0216995 A1 | 9/2007 | Bollond et al. | |
| 2008/0174762 A1 | 7/2008 | Liu et al. | |
| 2008/0193135 A1 | 8/2008 | Du et al. | |
| 2009/0010644 A1 | 1/2009 | Varshneya et al. | |
| 2009/0051926 A1 | 2/2009 | Chen | |
| 2009/0059201 A1 | 3/2009 | Willner et al. | |
| 2009/0067453 A1 | 3/2009 | Mizuuchi et al. | |
| 2009/0147239 A1 | 6/2009 | Zhu | |
| 2009/0262760 A1 | 10/2009 | Krupkin et al. | |
| 2009/0316134 A1 | 12/2009 | Michael et al. | |
| 2010/0006760 A1 | 1/2010 | Lee et al. | |
| 2010/0020306 A1 | 1/2010 | Hall | |
| 2010/0020377 A1 * | 1/2010 | Borchers | H04N 9/3185 |
| | | | 359/216.1 |
| 2010/0027602 A1 | 2/2010 | Abshire et al. | |
| 2010/0045965 A1 | 2/2010 | Meneely | |
| 2010/0053715 A1 | 3/2010 | O'Neill et al. | |
| 2010/0128109 A1 | 5/2010 | Banks | |
| 2010/0271614 A1 | 10/2010 | Albuquerque et al. | |
| 2011/0181864 A1 | 7/2011 | Schmitt et al. | |
| 2012/0038903 A1 | 2/2012 | Weimer et al. | |
| 2012/0124113 A1 | 5/2012 | Zalik et al. | |

(56) References Cited

U.S. PATENT DOCUMENTS

| | | |
|---|---|---|
| 2012/0221142 A1 | 8/2012 | Doak |
| 2013/0107016 A1 | 5/2013 | Federspeil |
| 2013/0116971 A1 | 5/2013 | Retkowski et al. |
| 2013/0241761 A1 | 9/2013 | Cooper et al. |
| 2013/0293867 A1 | 11/2013 | Hsu et al. |
| 2013/0293946 A1 | 11/2013 | Fermann et al. |
| 2013/0329279 A1 | 12/2013 | Nati et al. |
| 2013/0342822 A1* | 12/2013 | Shiraishi ............... G01S 17/88 356/4.01 |
| 2014/0078514 A1 | 3/2014 | Zhu |
| 2014/0104594 A1 | 4/2014 | Gammenthaler |
| 2014/0347650 A1 | 11/2014 | Bosch |
| 2014/0350836 A1 | 11/2014 | Stettner et al. |
| 2015/0078123 A1 | 3/2015 | Batcheller et al. |
| 2015/0084805 A1 | 3/2015 | Dawber |
| 2015/0109603 A1 | 4/2015 | Kim et al. |
| 2015/0116692 A1 | 4/2015 | Zuk et al. |
| 2015/0124238 A1* | 5/2015 | Sakai ................... G01S 7/4817 356/4.01 |
| 2015/0139259 A1 | 5/2015 | Robinson |
| 2015/0158489 A1 | 6/2015 | Oh et al. |
| 2015/0338270 A1 | 11/2015 | Williams et al. |
| 2015/0355327 A1 | 12/2015 | Goodwin et al. |
| 2016/0003946 A1 | 1/2016 | Gilliland et al. |
| 2016/0047896 A1 | 2/2016 | Dussan |
| 2016/0047900 A1 | 2/2016 | Dussan |
| 2016/0047902 A1 | 2/2016 | Ishikawa et al. |
| 2016/0061655 A1 | 3/2016 | Nozawa |
| 2016/0061935 A1 | 3/2016 | Mccloskey et al. |
| 2016/0100521 A1 | 4/2016 | Halloran et al. |
| 2016/0117048 A1 | 4/2016 | Frame et al. |
| 2016/0172819 A1 | 6/2016 | Ogaki |
| 2016/0178736 A1 | 6/2016 | Chung |
| 2016/0226210 A1 | 8/2016 | Zayhowski et al. |
| 2016/0245902 A1 | 8/2016 | Natnik |
| 2016/0291134 A1 | 10/2016 | Droz et al. |
| 2016/0313445 A1 | 10/2016 | Bailey et al. |
| 2016/0327646 A1 | 11/2016 | Scheim et al. |
| 2017/0003116 A1 | 1/2017 | Yee et al. |
| 2017/0153319 A1 | 6/2017 | Villeneuve et al. |
| 2017/0242104 A1 | 8/2017 | Dussan |
| 2017/0299721 A1 | 10/2017 | Eichenholz et al. |
| 2017/0307738 A1 | 10/2017 | Schwarz et al. |
| 2017/0365105 A1 | 12/2017 | Rao et al. |
| 2018/0040171 A1 | 2/2018 | Kundu et al. |
| 2018/0050704 A1 | 2/2018 | Tascione et al. |
| 2018/0069367 A1 | 3/2018 | Villeneuve et al. |
| 2018/0152691 A1 | 5/2018 | Pacala et al. |
| 2018/0158471 A1 | 6/2018 | Vaughn et al. |
| 2018/0164439 A1 | 6/2018 | Droz et al. |
| 2018/0156896 A1 | 7/2018 | O'Keeffe |
| 2018/0188355 A1 | 7/2018 | Bao et al. |
| 2018/0188357 A1 | 7/2018 | Li et al. |
| 2018/0188358 A1 | 7/2018 | Li et al. |
| 2018/0188371 A1 | 7/2018 | Bao et al. |
| 2018/0210084 A1 | 7/2018 | Zwölfer et al. |
| 2018/0275274 A1 | 9/2018 | Bao et al. |
| 2018/0284241 A1 | 10/2018 | Campbell et al. |
| 2018/0284242 A1 | 10/2018 | Campbell |
| 2018/0284246 A1 | 10/2018 | LaChapelle |
| 2018/0284286 A1 | 10/2018 | Eichenholz et al. |
| 2018/0329060 A1 | 11/2018 | Pacala et al. |
| 2018/0359460 A1 | 12/2018 | Pacala et al. |
| 2019/0025428 A1 | 1/2019 | Li et al. |
| 2019/0101627 A1* | 4/2019 | Hansson ............... G01S 17/87 |
| 2019/0107607 A1 | 4/2019 | Danziger |
| 2019/0107623 A1 | 4/2019 | Campbell et al. |
| 2019/0120942 A1 | 4/2019 | Zhang et al. |
| 2019/0120962 A1 | 4/2019 | Gimpel et al. |
| 2019/0154804 A1 | 5/2019 | Eichenholz |
| 2019/0154807 A1 | 5/2019 | Steinkogler et al. |
| 2019/0212416 A1 | 7/2019 | Li et al. |
| 2019/0250254 A1 | 8/2019 | Campbell et al. |
| 2019/0257924 A1 | 8/2019 | Li et al. |
| 2019/0265334 A1 | 8/2019 | Zhang et al. |
| 2019/0265336 A1 | 8/2019 | Zhang et al. |
| 2019/0265337 A1 | 8/2019 | Zhang et al. |
| 2019/0265339 A1 | 8/2019 | Zhang et al. |
| 2019/0277952 A1 | 9/2019 | Beuschel et al. |
| 2019/0310351 A1* | 10/2019 | Hughes ................ G01S 7/4817 |
| 2019/0310368 A1 | 10/2019 | LaChapelle |
| 2019/0369215 A1 | 12/2019 | Wang et al. |
| 2019/0369258 A1 | 12/2019 | Hall et al. |
| 2019/0383915 A1 | 12/2019 | Li et al. |
| 2020/0142070 A1 | 5/2020 | Hall et al. |
| 2020/0166647 A1* | 5/2020 | Crouch ................ G01S 7/4814 |
| 2020/0256964 A1 | 8/2020 | Campbell et al. |
| 2020/0284906 A1 | 9/2020 | Eichenholz et al. |
| 2020/0319310 A1 | 10/2020 | Hall et al. |
| 2020/0400798 A1 | 12/2020 | Rezk et al. |
| 2021/0088630 A9 | 3/2021 | Zhang |
| 2022/0113406 A1 | 4/2022 | Cho et al. |
| 2022/0128672 A1 | 4/2022 | Kim et al. |

FOREIGN PATENT DOCUMENTS

| | | |
|---|---|---|
| CN | 108132472 A | 6/2018 |
| CN | 207457508 U | 6/2018 |
| CN | 207557465 U | 6/2018 |
| CN | 208314210 U | 1/2019 |
| CN | 208421228 U | 1/2019 |
| CN | 208705506 U | 4/2019 |
| CN | 106597471 B | 5/2019 |
| CN | 209280923 U | 8/2019 |
| CN | 108445468 B | 11/2019 |
| CN | 110031823 B | 3/2020 |
| CN | 108089201 B | 4/2020 |
| CN | 109116331 B | 4/2020 |
| CN | 109917408 8 | 4/2020 |
| CN | 109116366 B | 5/2020 |
| CN | 109116367 B | 5/2020 |
| CN | 110031822 B | 5/2020 |
| CN | 211655309 U | 10/2020 |
| CN | 109188397 B | 11/2020 |
| CN | 109814086 B | 11/2020 |
| CN | 109917348 B | 11/2020 |
| CN | 110492856 B | 11/2020 |
| CN | 110736975 B | 11/2020 |
| CN | 109725320 B | 12/2020 |
| CN | 110780284 B | 12/2020 |
| CN | 110780283 B | 1/2021 |
| CN | 112204419 A | 1/2021 |
| CN | 110784220 B | 2/2021 |
| CN | 212623082 U | 2/2021 |
| CN | 110492349 B | 3/2021 |
| CN | 109950784 B | 5/2021 |
| CN | 213182011 U | 5/2021 |
| CN | 213750313 U | 7/2021 |
| CN | 214151038 U | 9/2021 |
| CN | 109814082 B | 10/2021 |
| CN | 113491043 A | 10/2021 |
| CN | 214795200 U | 11/2021 |
| CN | 214795206 U | 11/2021 |
| CN | 214895784 U | 11/2021 |
| CN | 214895810 U | 11/2021 |
| CN | 215641806 U | 1/2022 |
| CN | 112639527 8 | 2/2022 |
| CN | 215932142 U | 3/2022 |
| CN | 112578396 B | 4/2022 |
| DE | 41 42 702 A1 | 6/1993 |
| EP | 0 757 257 B1 | 2/1997 |
| EP | 1 237 305 A2 | 9/2002 |
| EP | 1 923 721 A1 | 5/2008 |
| EP | 2 157 445 A2 | 2/2010 |
| EP | 2 395 368 A1 | 12/2011 |
| EP | 2 889 642 A1 | 7/2015 |
| EP | 4020005 A1 | 6/2022 |
| GB | 1 427 164 A | 3/1976 |
| GB | 2000411 | 1/1979 |
| JP | S 62-8119 A | 1/1987 |
| JP | H 6-83998 A | 3/1994 |
| JP | 2007144667 A | 6/2007 |
| JP | 2010035385 A | 2/2010 |
| JP | 2017-003347 A | 1/2017 |

(56) References Cited

FOREIGN PATENT DOCUMENTS

| | | |
|---|---|---|
| JP | 2017-138301 A | 8/2017 |
| KR | 10-2012-0013515 A | 2/2012 |
| KR | 10-2013-0068224 A | 6/2013 |
| KR | 10-2018-0107673 A | 10/2018 |
| WO | 98/16801 A1 | 4/1998 |
| WO | 2017/110417 A1 | 6/2017 |
| WO | 2018/125725 A1 | 7/2018 |
| WO | 2018/129410 A1 | 7/2018 |
| WO | 2018129408 A1 | 7/2018 |
| WO | 2018129409 A1 | 7/2018 |
| WO | 2018129410 A1 | 7/2018 |
| WO | 2018175990 | 9/2018 |
| WO | 2018182812 A2 | 10/2018 |
| WO | 2019079642 | 4/2019 |
| WO | 2019165095 | 8/2019 |
| WO | 2019165289 A1 | 8/2019 |
| WO | 2019165294 | 8/2019 |
| WO | 2020013890 A2 | 1/2020 |
| WO | 2021035428 A1 | 3/2021 |

OTHER PUBLICATIONS

Goldstein, R. (Apr. 1986) "Electro-Optic Devices in Review, The Linear Electro-Optic (Pockels) Effect Forms the Basis for a Family of Active Devices," Laser & Applications, FastPulse Technology, Inc., 6 pages.
International Preliminary Report on Patentability, dated Jul. 9, 2019, for International Application No. PCT/US2018/012703, 10 pages.
International Preliminary Report on Patentability, dated Jul. 9, 2019, for International Application No. PCT/US2018/012704, 7 pages.
International Preliminary Report on Patentability, dated Jul. 9, 2019, for International Application No. PCT/US2018/012705, 7 pages.
International Search Report and Written Opinion, dated Jan. 17, 2020, for International Application No. PCT/US2019/019276, 14 pages.
International Search Report and Written Opinion, dated Jul. 9, 2019, for International Application No. PCT/US2019/018987, 17 pages.
International Search Report and Written Opinion, dated Sep. 18, 2018, for International Application No. PCT/US2018/012116, 12 pages.
International Search Report and Written Opinion, dated May 3, 2019, for International Application No. PCT/US2019/019272, 16 pages.
International Search Report and Written Opinion, dated May 6, 2019, for International Application No. PCT/US2019/019264, 15 pages.
International Search Report and Written Opinion, dated Jan. 3, 2019, for International Application No. PCT/US2018/056577, 15 pages.
International Search Report and Written Opinion, dated Mar. 23, 2018, for International Application No. PCT/US2018/012704, 12 pages.
International Search Report and Written Opinion, dated Jun. 7, 2018, for International Application No. PCT/US2018/024185, 9 pages.
International Preliminary Report on Patentability, dated Apr. 30, 2020, for International Application No. PCT/US2018/056577, 8 pages.
European Search Report, dated Jul. 17, 2020, for EP Application No. 18776977.3, 12 pages.
Extended European Search Report, dated Jul. 10, 2020, for EP Application No. 18736738.8, 9 pages.
Gunzung, Kim, et al. (Mar. 2, 2016). "A hybrid 3D LIDAR imager based on pixel-by-pixel scanning and DS-OCDMA," pages Proceedings of SPIE [Proceedings of SPIE ISSN 0277-786X vol. 10524], SPIE, US, vol. 9751, pp. 975119-975119-8.
Extended European Search Report, dated Jul. 22, 2020, for EP Application No. 18736685.1, 10 pages.
Gluckman, J. (May 13, 2016). "Design of the processing chain for a high-altitude, airborne, single-photon lidar mapping instrument," Proceedings of SPIE; [Proceedings of SPIE ISSN 0277-786X vol. 10524], SPIE, US, vol. 9832, 9 pages.
Office Action Issued in Japanese Patent Application No. 2019-536019 dated Nov. 30, 2021, 6 pages.
European Search Report, dated Jun. 17, 2021, for EP Application No. 18868896.4, 7 pages.
"Fiber laser," Wikipedia, https://en.wikipedia.org/wiki/Fiber_laser, 6 pages.
International Search Report and Written Opinion, dated Mar. 19, 2018, for International Application No. PCT/US2018/012705, 12 pages.
International Search Report and Written Opinion, dated Mar. 20, 2018, for International Application No. PCT/US2018/012703, 13 pages.
International Search Report and Written Opinion issued in International Application No. PCT/US2022/025248 dated Sep. 6, 2022, 19 pages.
"Mirrors", Physics LibreTexts, https://phys.libretexts.org/Bookshelves/Optics/Supplemental_Modules_(Components)/Mirrors, (2021), 2 pages.
"Why Wavelengths Matter in Fiber Optics", FirstLight, https://www.firstlight.net/why-wavelengths-matter-in-fiber-optics/, (2021), 5 pages.

* cited by examiner

VARIABLE ANGLE POLYGON FOR USE WITH A LiDAR SYSTEM

This application claims the benefit of U.S. Provisional Application No. 62/829,441, filed Apr. 4, 2019, the disclosure of which is incorporated herein in its entirety.

FIELD OF THE INVENTION

The present disclosure relates generally to laser scanning and, more particularly, to using a variable angle polygon to redirect light energy for a LiDAR system.

BACKGROUND

Systems exist that enable vehicles to be driven semi-autonomously or fully autonomously. Such systems may use one or more range finding, mapping, or object detection systems to provide sensory input to assist in semi-autonomous or fully autonomous vehicle control. Light detection and ranging (LiDAR) systems, for example, can provide the sensory input required by a semi-autonomous or fully autonomous vehicle. LiDAR systems use light pulses to create an image or point cloud of the external environment. Some typical LiDAR systems include a light source, a steering system, and light detector. The light source generates light pulses that are directed by the pulse steering system in particular directions when being transmitted from the LiDAR system. When a transmitted light pulse is scattered by an object, some of the scattered light is returned to the LiDAR system as a returned pulse. The light detector detects the returned pulse. Using the time it took for the returned pulse to be detected after the light pulse was transmitted and the speed of light, the LiDAR system can determine the distance to the object along the path of the transmitted light pulse. The steering system can direct light pulses along different paths to allow the LiDAR system to scan the surrounding environment and produce an image or point cloud.

Steering systems in conventional LiDAR systems typically use two or more moving components to control projection of light signals within the field of view (FOV) of the LiDAR system. For example, the conventional steering system can use two independently controlled mirrors to project light pulses within the FOV. A first mirror may be used to control the light pulse steering along a first axis and a second mirror can be used to control the light pulse steering along a second axis. Use of multiple independently controlled mirrors adds complexity, cost, and increased energy consumption. It is desirable to simplify the steering system by removing one of the mirrors being used in the steering system.

BRIEF SUMMARY

Embodiments discussed herein refer to variable geometry multi-faceted polygon for use with a LiDAR system and methods for the use thereof.

In one embodiment, a LiDAR system is provided that can include a laser subsystem operative to emit an array of light beams, and a variable angle multi-facet polygon (VAMFP) operative to redirect the array of light beams to a field of view (FOV), the VAMFP comprising a plurality of facets each having a facet angle, wherein the facet angle of each of the plurality of facets corresponds to a different band within the FOV.

In one embodiment, the plurality of facet angles corresponds to a plurality of different bands, respectively, within the FOV.

In one embodiment, the plurality of different bands are non-overlapping and contiguous.

In one embodiment, the plurality of different bands are non-contiguous.

In one embodiment, at least two of the plurality of different bands overlap each other.

In one embodiment, the laser subsystem comprises an array of diode lasers that outputs the array of light beams.

In one embodiment, the laser subsystem can include a fiber laser operative to output a single light beam, and a splitter operative to receive the single light beam and output the array of light beams.

In one embodiment, the VAMFP can include a multi-sided polygon, and a plurality of wedge segments secured to the multi-sided polygon, wherein the plurality of wedge segments form the plurality of facets each having the facet angle.

In one embodiment, the facet angle is different for each of the plurality of facets.

In one embodiment, the array of light beams comprises a plurality of light beams that are spaced equidistantly apart from each other.

In one embodiment, the VAMFP is operative to rotate about a rotation axis, wherein rotation of the VAMFP enables the VAMFP to direct the array of light pulses across two axes with the FOV.

In one embodiment, the LiDAR system further includes a motor operative to rotate the VAMFP about the rotation axis.

In one embodiment, a LiDAR system scanning component is provided that includes a variable angle multi-facet polygon comprising a plurality of facets each having a different facet angle, wherein each facet is operative to redirect any light beam that interacts therewith to a band, within a LiDAR system field of view (FOV), corresponding to the facet angle associated to that particular facet.

In one embodiment, each facet corresponds to different band with the LIDAR FOV.

In one embodiment, the variable angle multi-facet polygon is machined.

In one embodiment, the variable angle multi-facet polygon can include a multi-sided polygon, and a plurality of wedge segments secured to the multi-sided polygon, wherein the plurality of wedge segments forms the plurality of facets each having the different facet angle.

In one embodiment, the plurality of facets comprises five or six facets.

In one embodiment, a method for directing light pulses to a field of view (FOV) of a LiDAR system is provided that can include emitting, from a laser subsystem, an array of light beams, and redirecting the array of light beams by a variable angle multi-facet polygon (VAMFP) to the FOV, the VAMFP comprising a plurality of facets each having a facet angle, wherein the facet angle of each of the plurality of facets corresponds to a different band within the FOV.

In one embodiment, the method can further include receiving return signals from the FOV via the VAMFP, and processing the received return signals.

In one embodiment, the method can include rotating the VAMFP along a rotation axis.

A further understanding of the nature and advantages of the embodiments discussed herein may be realized by reference to the remaining portions of the specification and the drawings.

DETAILED DESCRIPTION

Illustrative embodiments are now described more fully hereinafter with reference to the accompanying drawings, in which representative examples are shown. Indeed, the disclosed LiDAR systems and methods may be embodied in many different forms and should not be construed as limited to the embodiments set forth herein. Like numbers refer to like elements throughout.

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

Figure 1:
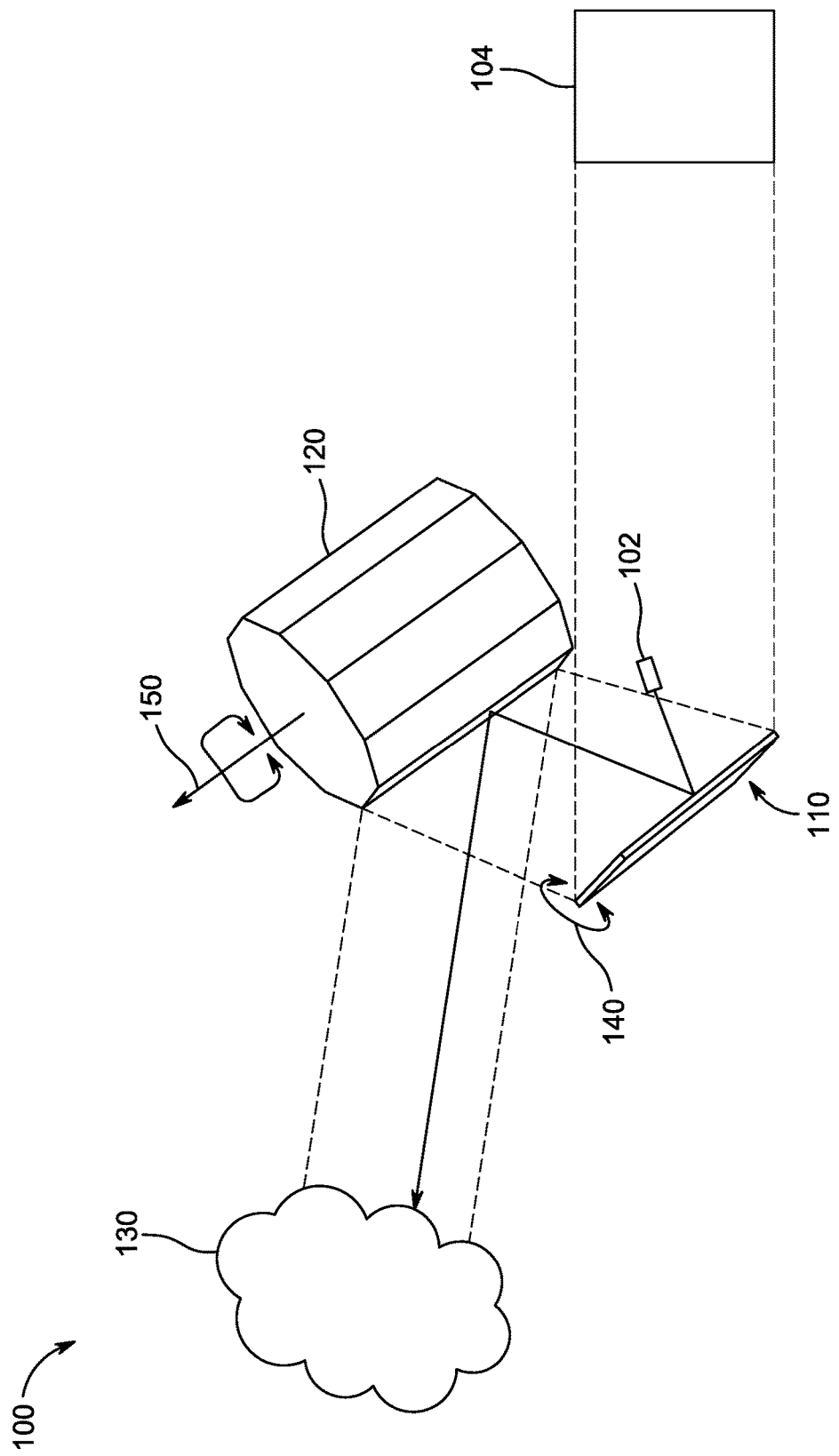
FIG. 1 shows conventional LiDAR system.

FIG. 1 shows conventional LiDAR system 100. Light signals generated by laser source 102 are directed to mirror 110, which redirects the light signal to polygon 120, which projects the light signal to the LiDAR FOV. Any objects such as object 130 in the FOV cause a light pulse to be returned to LiDAR system 100. Return signals reflect off polygon 120, reflect off mirror 110, and return to receiver sub system 104 for processing. Mirror 110 can rotate about axis 140, which is perpendicular to axis 150, and can control the projection of light signals in the x-direction. Polygon 120 can rotate about axis 150 and can control the projection of light signals in the y-direction. Embodiments discussed herein eliminate mirror 110 and replace polygon 120 with a variable angle multi-facet polygon.

A variable angle multi-facet polygon (VAMFP) according to embodiments discussed herein can be used in conjunction with a laser array to control scanning in both x and y axes of the LiDAR FOV. The VAMFP is a polygon that has several facets. Each facet has an area defined by a width and a length and each facet has a facet angle. The number of facets may define the bounds of the FOV along a first axis (e.g., the horizontal axis). For example, if there are five facets, the horizontal FOV is 144 degrees. If there are six facets, the horizontal FOV is 120 degrees. In general, the horizontal FOV is 360 divided by the number of facets. The width of each facet may be the same. In some embodiments, the length of each facet may be same. In other embodiments, the length of each facet may vary, depending on the facet angle. The facet angle is responsible for controlling the projection of light pulses in the vertical FOV. Since each facet can have a different angle, each facet is responsible for projecting light pulses to a particular region within the vertical FOV. The facet angle refers to the angle of the facet with respect to a common reference plane (e.g., a top planar surface or a bottom planar surface of the VAMFP). The facet angle determines where light pulses interacting with the face of the facet are redirected.

Figure 2:
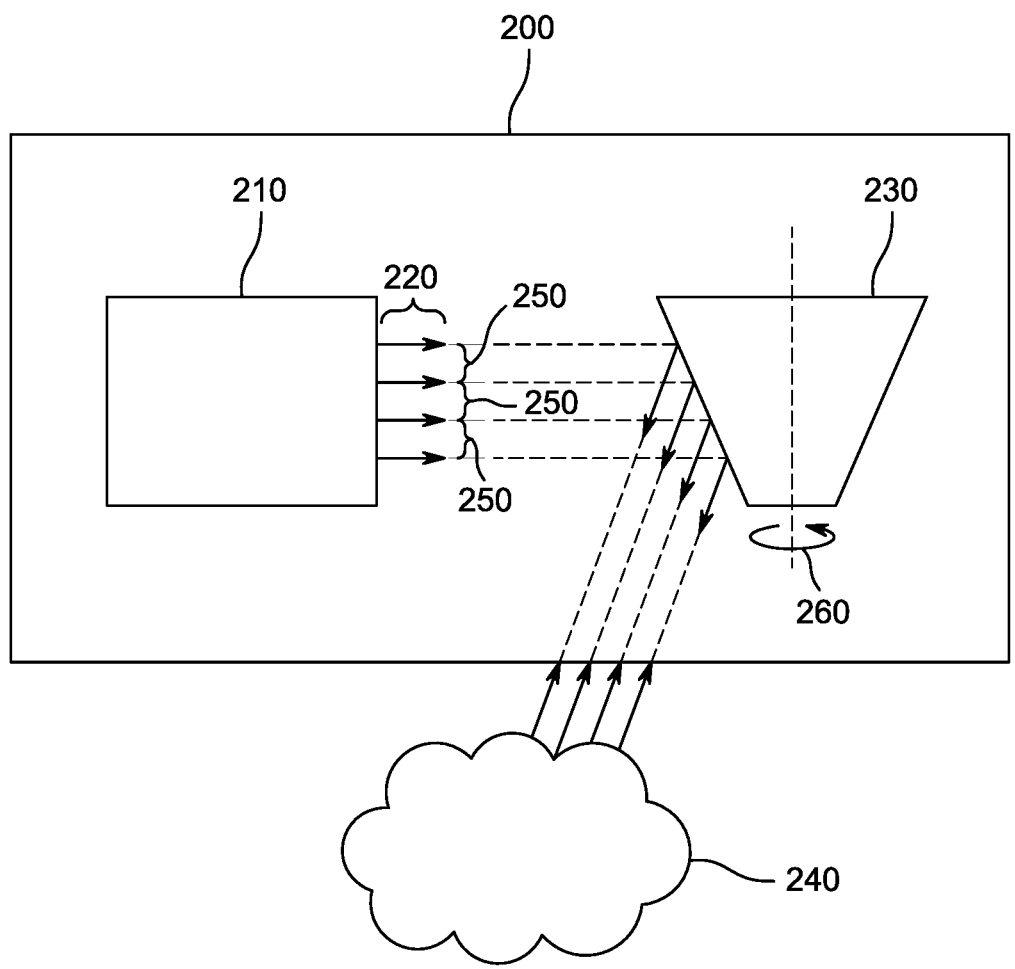
FIG. 2 illustrates a simplified LiDAR system according to an embodiment.

FIG. 2 illustrates simplified LiDAR system 200 according to an embodiment. System 200 can include laser subsystem 210 and VAMFP 230. Laser subsystem 210 can provide light array 220, including two or more beams, to VAMFP 230. Laser subsystem 210 can include, for example, multiple laser emitting diodes to provide light array 220. In another embodiment, laser subsystem 210 can include a single laser source (e.g., a fiber laser) and a splitter to provide light array 220. VAMFP 230 rotates about axis 260 and redirects the beams of light array 220 to a LiDAR FOV. Light scattered off object 240 in the LiDAR FOV is returned back to VAMFP 230, which redirects the returned light to a receiver subsystem (not shown). Light array 220 may include two or more equidistantly spaced beams. For example, as shown in FIG. 2, four beams with equidistant inter-beam spacing (IBS) 250 are provided. In one embodiment, each of the beams in light array 220 may be parallel to each other. In another embodiment, an inter-beam angle between adjacent light beams is the same, such that each of the beams in light array 220 converges at the same point at a fixed distance away from a common plane associate with each beam in light array 220.

VAMFP 230 may be the only moving mirror component of system 200. Note that system 200 has eliminated the secondary mirror (e.g., a mirror analogous to mirror 110 of FIG. 1). Eliminating the secondary mirror can reduce cost, complexity, and power consumption.

Figure 3A:
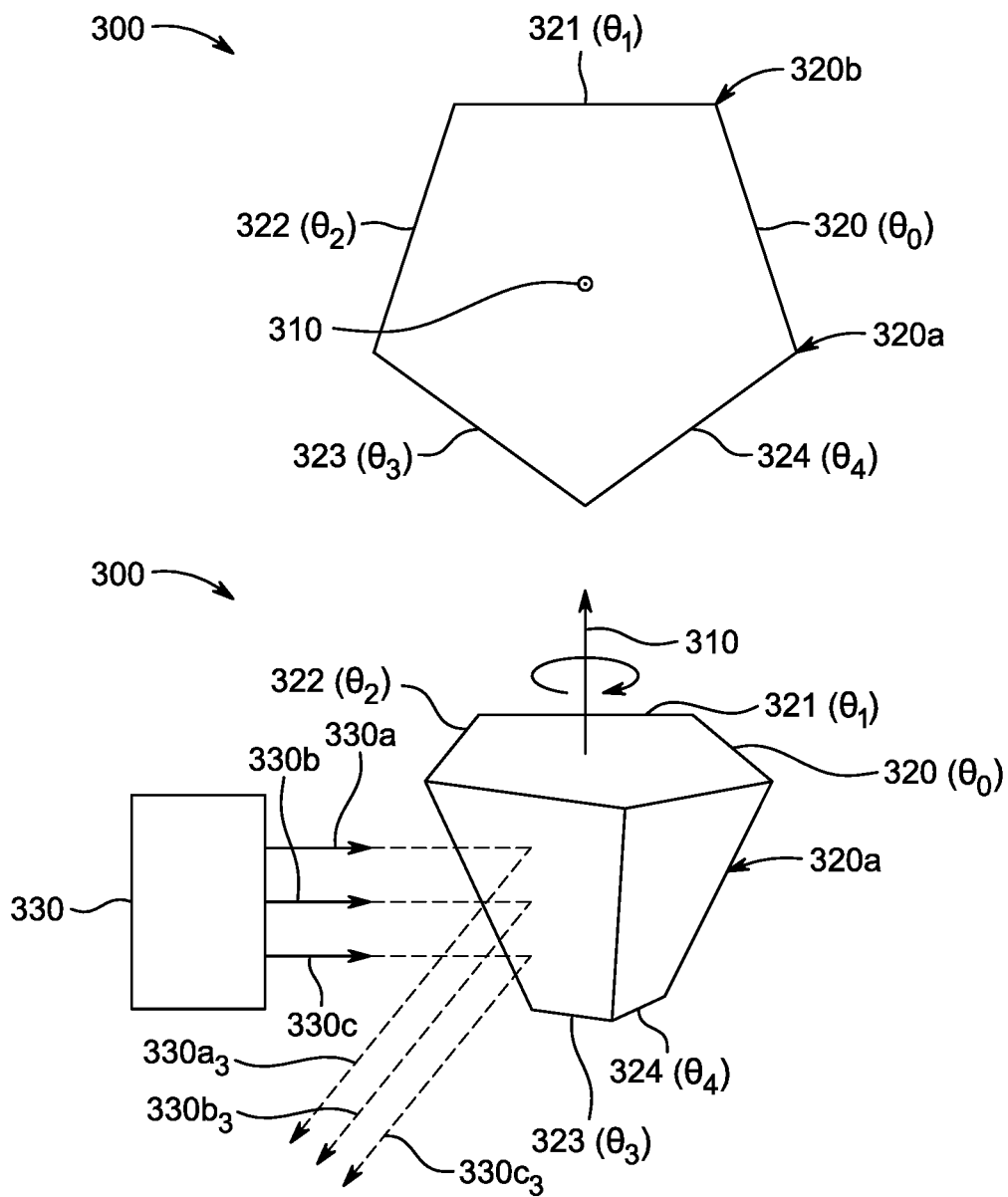
FIGS. 3A, 3B, and 3C show different views of a variable angle multi facet polygon according to an embodiment.
Figure 3B:
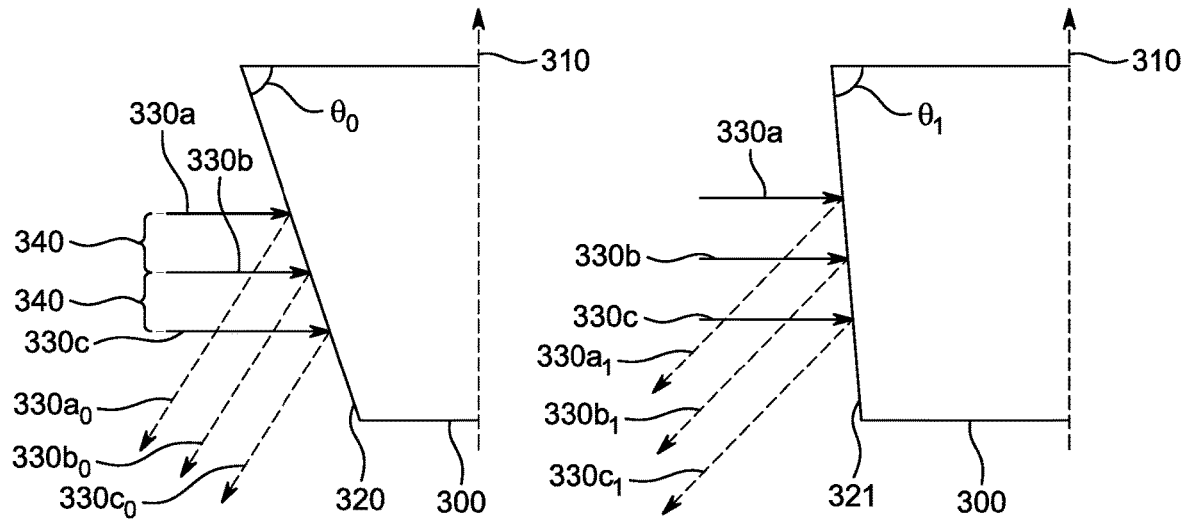
Figure 3C:
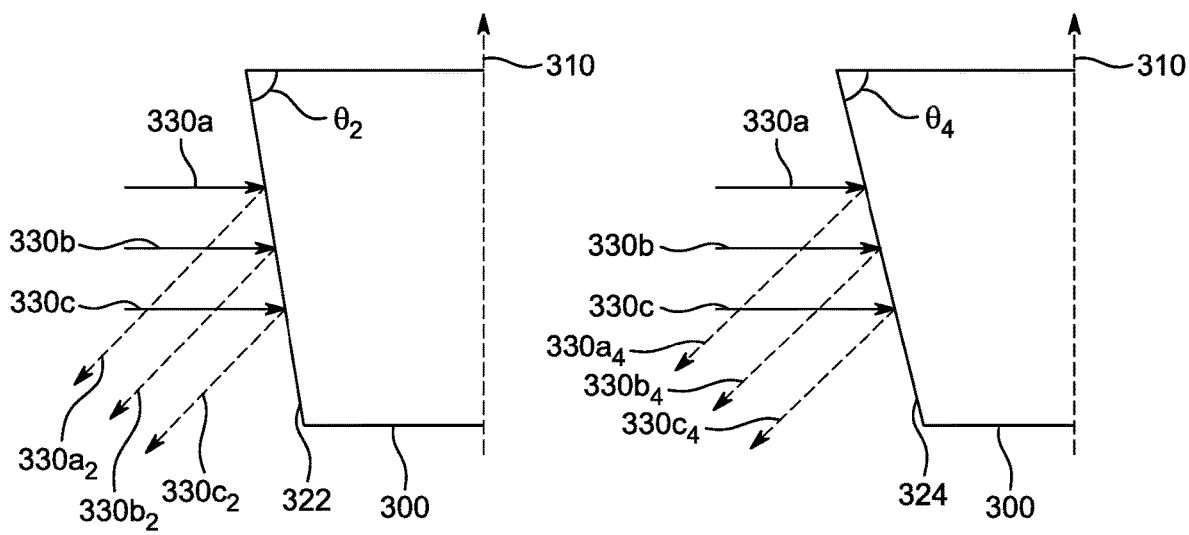

FIGS. 3A-3C show illustrative top view, first side view, and second side view of VAMFP 300 according to an embodiment and illustrates how a VAMFP controls both axes of a LiDAR FOV when coupled with a light array. VAMFP 300, which rotates about axis 310, is a polygon with multiple facets. For example, VAMFP 300 can include 5 facets, facets 320, 321, 322, 323, and 324. Each facet can have mirror finish or mirror-like reflecting property. Light array 330 include individual beams 330a-330c aimed towards VAMFP 300 such that light array 330 interfaces with each of facets 320, 321, 322, 323, and 324 in repeated succession as VAMFP 300 rotates about axis 310. Individual beams 330a-330c may be separated by inter beam spacing (MS) 340, and beams 330a-330c are redirected to LiDAR FOV 370 (of FIG. 3D). Each of facets 320, 321, 322, 323, and 324 has its own unique facet angle, shown as $\theta_0$-$\theta_4$, respectively. The facet angles represent the angle between facet surface and the top planar surface of polygon 300. As shown in FIGS. 3A, 3B and 3C, facet 320 corresponds with facet angle $\theta_0$, facet 321 corresponds with facet angle $\theta_1$, facet 322 corresponds with facet angle $\theta_2$, and facet 323 corresponds with facet angle $\theta_3$, facet 324 corresponds with facet angle $\theta_4$. FIGS. 3A, 3B and 3C illustrate individual beams 330a-330c being redirected by different facets 320-324. The redirected beams are each labeled with a subscripted number corresponding to the facet angle $\theta$. For example, beams being redirected by facet 320 are labeled as $330a_0$-$330c_0$, beams being redirected by facet 321 are labeled as $330a_1$-$330c_1$, beams being redirected by facet 322 are labeled as $330a_2$-$330c_2$, beams being redirected by facet 323 are labeled as $330a_3$-$330c_3$, and beams being redirected by facet 324 are labeled as $330a_4$-$330c_4$.

Figure 3D:
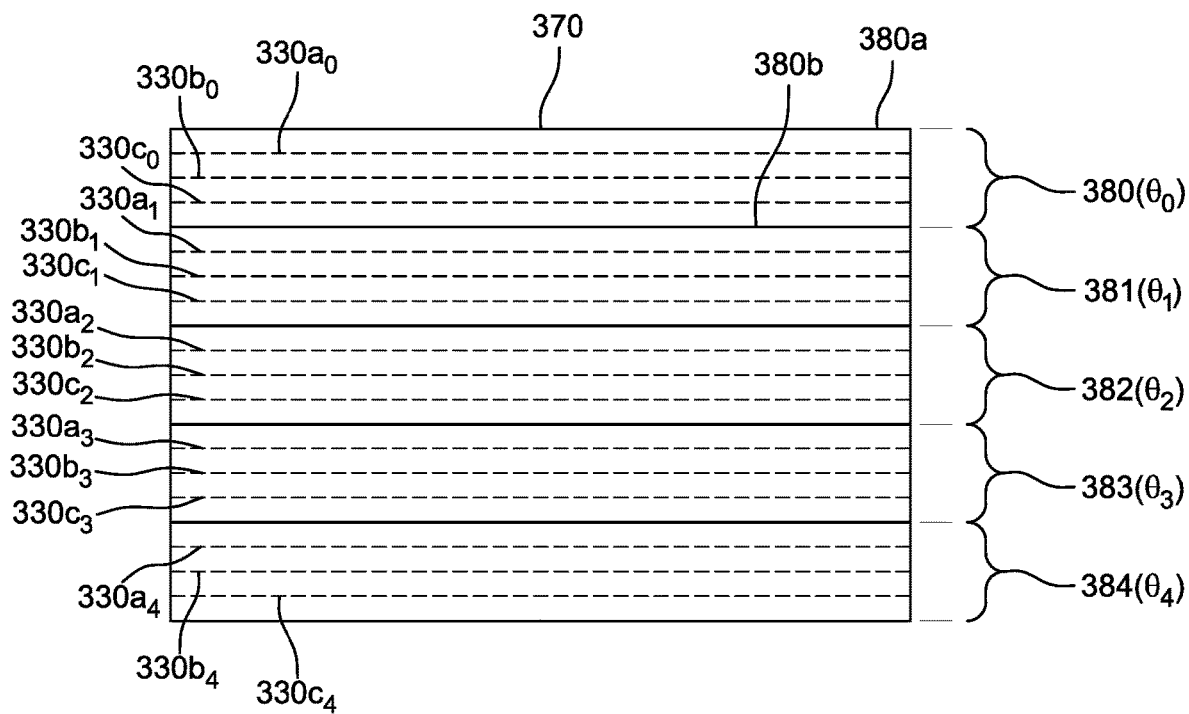
FIG. 3D shows illustrative LiDAR FOV according to an embodiment.

FIG. 3D shows illustrative LiDAR FOV 370 with five non-overlapping bands 380-384, each corresponding to one of facets 320-324 (and by default, the corresponding one of facet angles $\theta_0$-$\theta_4$). FOV 370 also shows redirected light pulses 330a0-330c0, 330a1-330c1, 330a2-330c2, 330a3-330c3, 330a4-330c4 in respective bands 380-384. Each of bands 380-384 spans the entire horizontal axis of FOV 370 and occupies a subset of the vertical axis of FOV 370. The boundary of each subset is defined by the dimensions and facet angle of a corresponding facet. For example, boundary edges 320a and 320b of facet 320 (shown in FIG. 3A) may define the boundary edges 380a and 380b of band 380 (shown in FIG. 3D), and facet angle $\theta_0$ defines where within the vertical FOV band 380 exists. The same facet to band boundary edges relationship and facet angle to vertical position within the vertical FOV hold true for the other facets and need not be repeated to avoid overcrowding the drawing.

In some embodiments, IBS 340 (shown in FIG. 3B), dimensions of facets 320-324, and facet angles $\theta_0$-$\theta_4$, are selected such that the beams 330a-c are uniformly distributed within their respective bands. In addition, IBS 340, dimensions of facets 320-324, and facet angles $\theta_0$-$\theta_4$ can be further selected to ensure that the spacing between the last beam in one band (e.g., $330c_0$) is equidistant to the first beam in the adjacent band (e.g., $330a_1$).

The facet angles $\theta_0$-$\theta_4$, as shown in FIGS. 3A-3D, are selected such that bands 380-384 do not overlap and are contiguous in their adjacency relationships. This is illustrative and it should be understood that the bands can be non-contiguous and that two or more bands may overlap. Examples of these alternatives are shown in connection with FIGS. 4A-4B.

It should be understood that use of five facets in VAMFP 300 and a three-beam light array are merely illustrative and that any number of facets and any number of beams in the light array may be used.

Figure 4A:
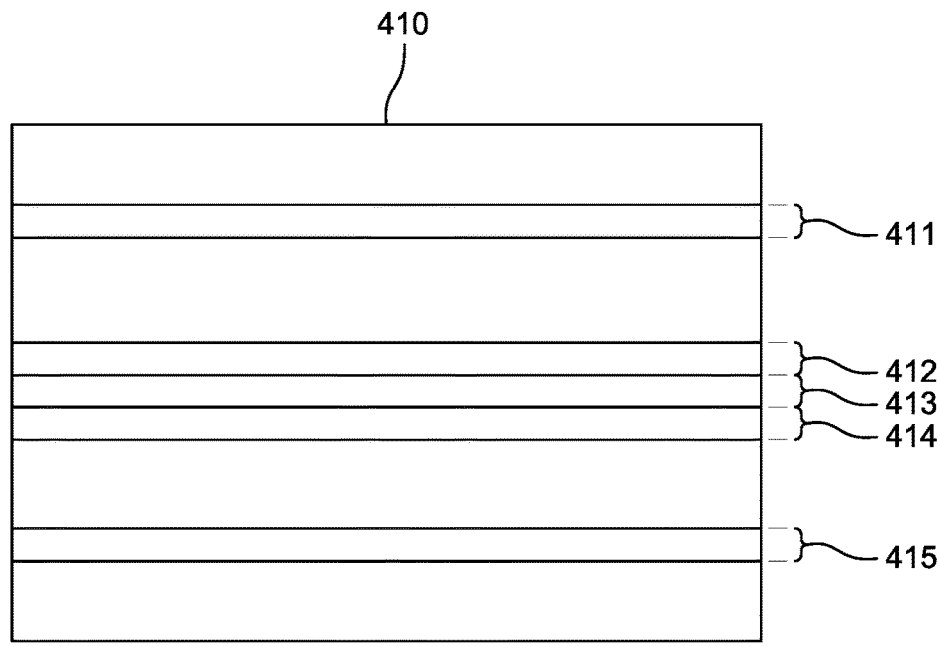
FIGS. 4A and 4B show different illustrative fields of view generated by a multi-faceted polygon according to various embodiments.
Figure 4B:
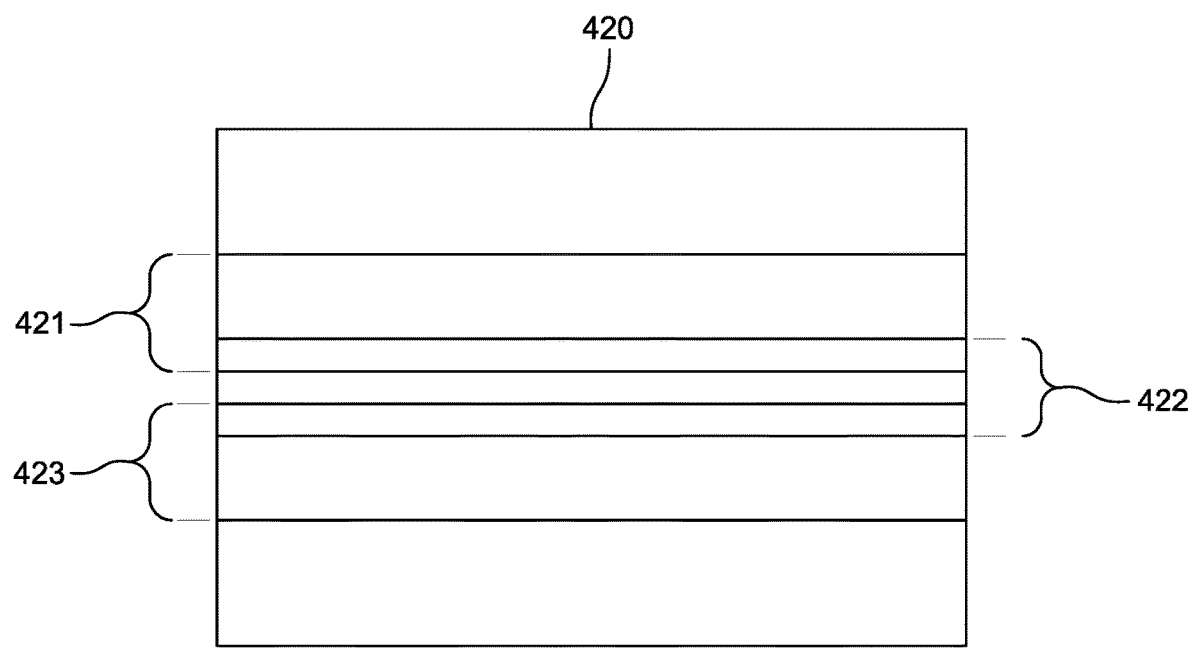

FIGS. 4A and 4B illustrate that many different FOV resolutions can be made possible by adjusting the the number of facets and corresponding facet angles and/or by adjusting the number of beams in a light array.

FIG. 4A shows an illustrative FOV 410 generated by a VAMFP according to an embodiment. FOV 410 can include bands 411-415 arranged in a non-uniform manner as shown. The individual light beams that are contained within each band are omitted. Band 411 is shown to occupy a region in a top portion of FOV 410, and band 415 is shown to occupy a region in a bottom portion of FOV 410. Bands 412-414 are shown to occupy a middle portion of FOV 410. Bands 412-414 are shown to be contiguous with respect to each other such that no discernable gaps exist between adjacent bands. Bands 411 and 415 are both shown to be standalone bands. That is band 411 is not contiguous with band 412, and band 415 is not contiguous with band 414.

FIG. 4B shows an illustrative FOV 420 generated by a VAMFP according to an embodiment. FOV 420 can include bands 421-423 arranged in a non-uniform and overlapping manner as shown. The individual light beams that are contained within each band are omitted. Bands 421-423 are shown to occupy a middle portion of FOV 420, with band 422 overlapping bands 421 and 423. This arrangement can produce an extra dense FOV mapping in the center region of the middle portion.

Figure 5:
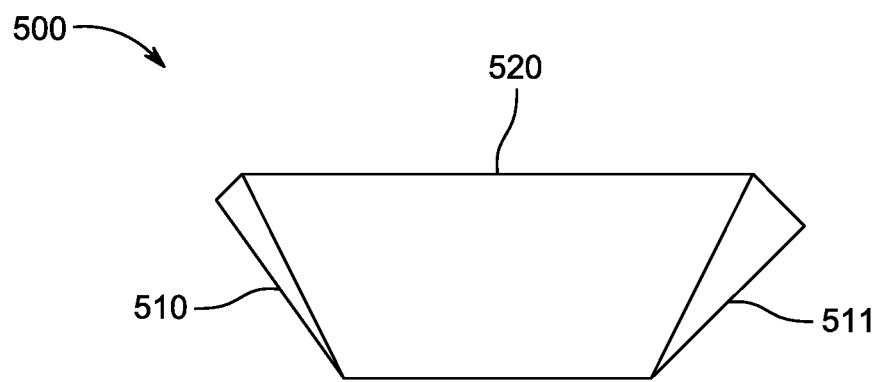
FIG. 5 depicts an embodiment of variable angle multi facet polygon constructed using multiple wedge segments according to an embodiment.

In some embodiments, the VAMFP may be machined to produce a desired number of mirrored facets at the desired facet angles. In other embodiments, such as that illustrated by FIG. 5, a standard polygon may be converted to a VAMFP by attaching wedge members to a multi-sided polygon. These wedge members may have facet angles designed to produce desired FOV and FOV resolution distribution. For example, FIG. 5 shows that VAMFP 500 is constructed by attached wedges 510 and 511 to respective sides of multi-sided polygon 520. Wedge segments 510 and 511 may be attached to polygon 520 by any suitable fastening mechanism (e.g., screw, fastener) or an adhesive. Only two wedges segments are shown, though it should be understood that each side of polygon 520 can be coupled to a wedge segment. Using wedge segments to produce a VAMFP may be less expensive machining a VAMFP.

Figure 6:
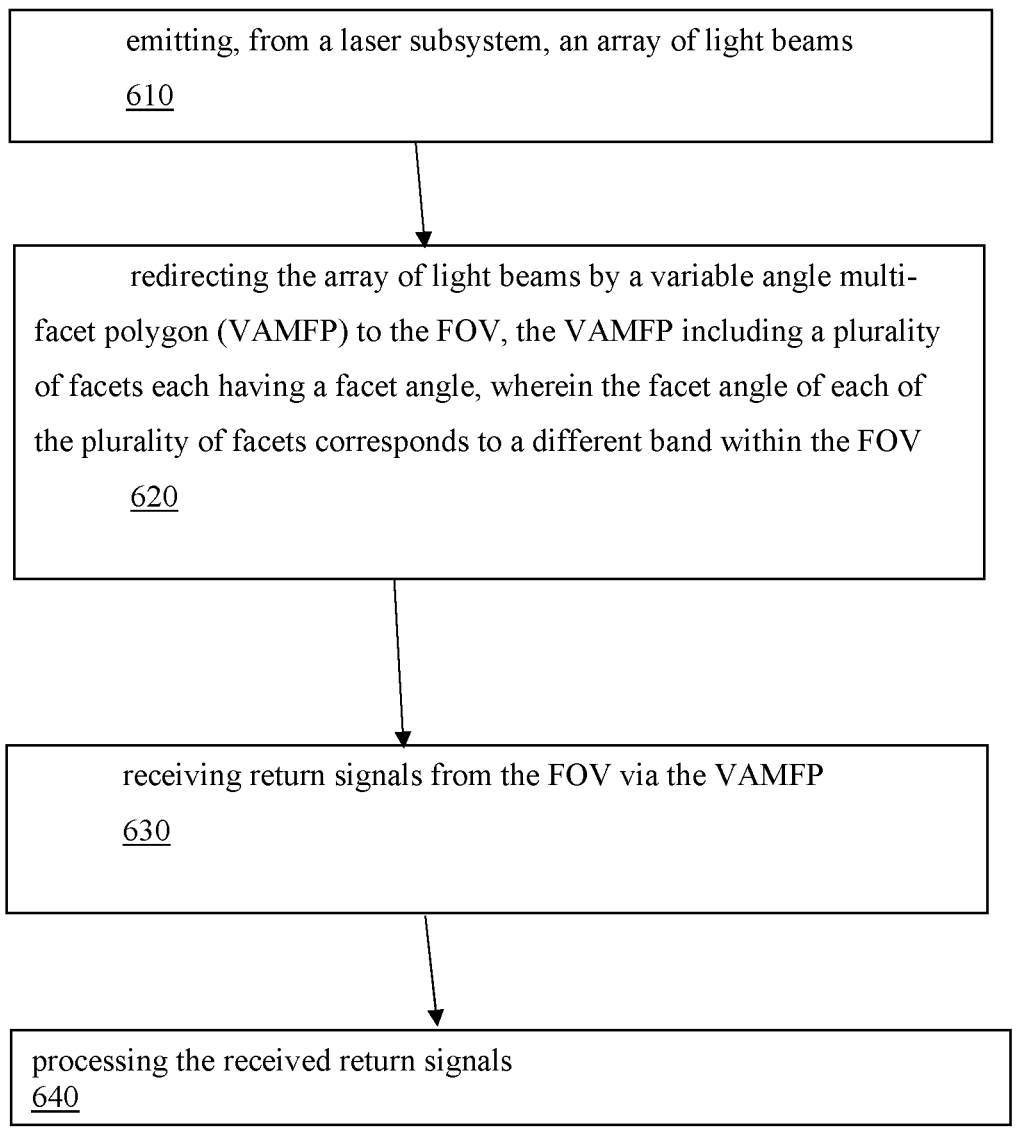
FIG. 6 shows an illustrative method for directing light pulses to a field of view of a LiDAR system according to an embodiment.

FIG. 6 shows an illustrative method for directing light pulses to a field of view of a LiDAR system according to an embodiment. Starting at step 610, an array of light beams may be emitted from a laser subsystem. At step 620, the array of light beams may be redirected by a VAMFP to the FOV. The VAMFP can include several facets each having a facet angle, wherein the facet angle of each of the plurality of facets corresponds to a different band within the FOV. The VAMFP can rotate along a rotation axis. At step 630, return signals from the FOV may be received via the VAMFP. At step 640, the received return signals can be processed. For example, the processed signals can be used a system to make decision regarding the operation of an autonomous vehicle.

It should be understood that the steps shown in FIG. 6 are merely illustrative and that additional steps may be added.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

Moreover, any processes described with respect to FIGS. 1-5, as well as any other aspects of the invention, may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices. The computer-readable medium can also be distributed over network-coupled computer systems so that the computer readable code is stored and executed in a distributed fashion. For example, the computer-readable medium may be communicated from one electronic subsystem or device to another electronic subsystem or device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module or state machine discussed herein may be provided as a software construct, firmware construct, one or more hardware components, or a combination thereof. For example, any one or more of the state machines or modules may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules or state machines are merely illustrative, and that the number, configuration, functionality, and interconnection of existing modules may be modified or omitted, additional modules may be added, and the interconnection of certain modules may be altered.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A LiDAR system, comprising:
   a laser subsystem configured to emit an array of light beams comprising a plurality of light beams; and
   a variable angle multi-facet polygon (VAMFP) configured to redirect the array of light beams to a field of view (FOV), the VAMFP comprising a plurality of facets each having a facet angle, wherein the facet angle of each of the plurality of facets corresponds to a different band of a plurality of bands within the FOV, wherein an inter-beam spacing (IBS) of the plurality of light beams is associated with the plurality of bands,
   wherein the IBS of the plurality of light beams is selected such that the IBS of at least two of the plurality of light beams are equidistant, and dimensions and the facet angle of each of the plurality of facets are selected such that a spacing of the at least two light beams in at least two bands of the associated plurality of bands are uniformly distributed within the at least two bands and the plurality of bands are bounded by at least one boundary edge, wherein a boundary edge of a band in the plurality of bands is defined by a boundary edge of a corresponding facet of the plurality of facets, and
   wherein the plurality of bands comprises at least three contiguous bands, a first band above the at least three contiguous bands, and a second band below the at least three contiguous bands, both the first band and the second band are non-contiguous to the at least three contiguous bands.

2. The LiDAR system of claim 1, wherein at least two of the plurality of different bands overlap each other.

3. The LiDAR system of claim 1, wherein the laser subsystem comprises an array of diode lasers that outputs the array of light beams.

4. The LiDAR system of claim 1, wherein the laser subsystem comprises:
   a fiber laser configured to output a single light beam; and
   a splitter configured to receive the single light beam and output the array of light beams.

5. The LiDAR system of claim 1, wherein the VAMFP comprises:
   a multi-sided polygon; and
   a plurality of wedge segments secured to the multi-sided polygon, wherein the plurality of wedge segments forms the plurality of facets.

6. The LiDAR system of claim 1, wherein the array of light beams comprises a plurality of light beams that are spaced equidistantly apart from each other.

7. The LiDAR system of claim 1, wherein the VAMFP is configured to rotate about a rotation axis, wherein rotation of the VAMFP enables the VAMFP to direct the array of light beams across two directions of the FOV.

8. The LiDAR system of claim 7, further comprising a motor configured to rotate the VAMFP about the rotation axis.

9. A LiDAR system scanning component, comprising:
   a variable angle multi-facet polygon comprising a plurality of facets each having a different facet angle, wherein each facet is configured to redirect any light beam of a plurality of light beams that interacts therewith to a plurality of bands, within a LiDAR system field of view (FOV), corresponding to the facet angle associated to that particular facet, wherein the facet angle of each of the plurality of facets corresponds to a different band of a plurality of bands within the FOV, wherein an inter-beam spacing (IBS) of the plurality of light beams is associated with the plurality of bands, and
   wherein the IBS of the plurality of light beams is selected such that the IBS of at least two of the plurality of light beams are equidistant, and dimensions and the facet angle of each of the plurality of facets are selected such that a spacing of the at least two light beams in at least two bands of the associated plurality of bands are uniformly distributed within the at least two bands and the plurality of bands are bounded by at least one boundary edge, wherein a boundary edge of a band in the plurality of bands is defined by a boundary edge of a corresponding facet of the plurality of facets, and
   wherein the plurality of bands comprises at least three contiguous bands, a first band above the at least three contiguous bands, and a second band below the at least three contiguous bands, both the first band and the second band are non-contiguous to the at least three contiguous bands.

10. The LiDAR system scanning component of claim 9, wherein the variable angle multi-facet polygon is machined.

11. The LiDAR system scanning component of claim 9, wherein the variable angle multi-facet polygon comprises:
    a multi-sided polygon; and
    a plurality of wedge segments secured to the multi-sided polygon, wherein the plurality of wedge segments forms the plurality of facets.

12. The LiDAR system scanning component of claim 9, wherein the plurality of facets comprises five or six facets.

13. A method for directing light pulses to a field of view (FOV) of a LiDAR system, comprising:
- emitting, from a laser subsystem, an array of light beams comprising a plurality of light beams; and
- redirecting the array of light beams by a variable angle multi-facet polygon (VAMFP) to the FOV, the VAMFP comprising a plurality of facets each having a facet angle, wherein the facet angle of each of the plurality of facets corresponds to a different band of a plurality of bands within the FOV, wherein an inter-beam spacing (IBS) of the plurality of light beams is associated with the plurality of bands, and
- wherein the IBS of the plurality of light beams is selected such that the IBS of at least two of the plurality of light beams are equidistant, and dimensions and the facet angle of each of the plurality of facets are selected such that a spacing of the at least two light beams in at least two bands of the associated plurality of bands are uniformly distributed within the at least two bands and the plurality of bands are bounded by at least one boundary edge, wherein a boundary edge of a band in the plurality of bands is defined by a boundary edge of a corresponding facet of the plurality of facets, and
- wherein the plurality of bands comprises at least three contiguous bands, a first band above the at least three contiguous bands, and a second band below the at least three contiguous bands, both the first band and the second band are non-contiguous to the at least three contiguous bands.

14. The method of claim 13, further comprising:
receiving return signals from the FOV via the VAMFP; and
processing the received return signals.

15. The method of claim 13, further comprising rotating the VAMFP about a rotation axis.

* * * * *